May 19, 1953

H. N. FAIRBANKS 2,639,147

SPROCKET ENCLOSING SYSTEM

Filed Nov. 1, 1950

HENRY N. FAIRBANKS
Inventor

By Daniel J. Mayne
J. Griffin Little
Attorneys

May 19, 1953 H. N. FAIRBANKS 2,639,147
SPROCKET ENCLOSING SYSTEM
Filed Nov. 1, 1950 3 Sheets-Sheet 2

HENRY N. FAIRBANKS
Inventor

By Daniel I. Mayne
J. Griffin Little
Attorneys

May 19, 1953     H. N. FAIRBANKS     2,639,147
SPROCKET ENCLOSING SYSTEM

Filed Nov. 1, 1950     3 Sheets-Sheet 3

HENRY N. FAIRBANKS
Inventor

By Daniel J. Mayne
J. Griffin Little
Attorneys

Patented May 19, 1953

2,639,147

UNITED STATES PATENT OFFICE 2,639,147

SPROCKET ENCLOSING SYSTEM

Henry N. Fairbanks, Rochester, N. Y., assignor to Eastman Kodak Company, Rochester, N. Y., a corporation of New Jersey Application November 1, 1950, Serial No. 193,395

18 Claims. (Cl. 271—2.3)

The present invention relates to a motion picture apparatus, and more particularly to a system for enclosing a film feeding or hold-back sprocket. The system, in its broadest aspects, comprises a dual housing which encloses the sprocket and also provides all the guiding and stripping means for the film strip.

The principal object of the invention is the provision of a simple and effective enclosure guide system for a film sprocket.

A further object of the invention is the incorporation of suitable film guides and strippers in the guard system to insure proper feeding and stripping of the film.

A still further object of the invention is the provision of an enclosure system which effectively retains the film in positive contact with the sprocket without the use of holding members, as is commonly required.

Yet another object of the invention is the provision of a system of the class described which is attractive, permits easy threading, relatively inexpensive to manufacture, embodies no moving parts, and is highly effective in use.

To these and other ends, the invention resides in certain improvements and combinations of parts, all as will be hereinafter more fully described, the novel features being pointed out in the claims at the end of the specification.

Figure 8:
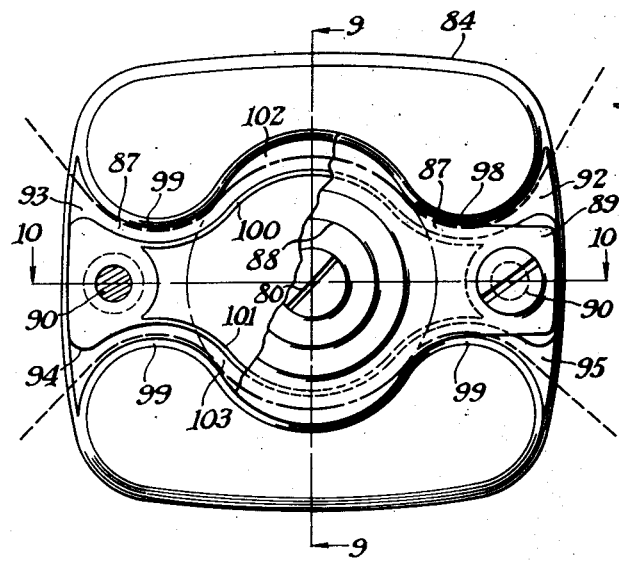
Fig. 8 is an end elevation view of still another embodiment of a sprocket enclosing system constructed in accordance with the present invention.
Figure 9:
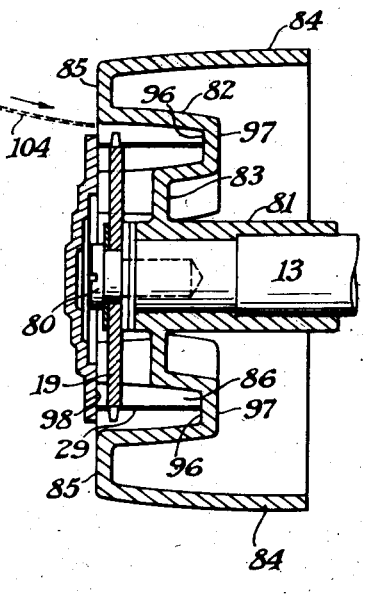
Figure 10:
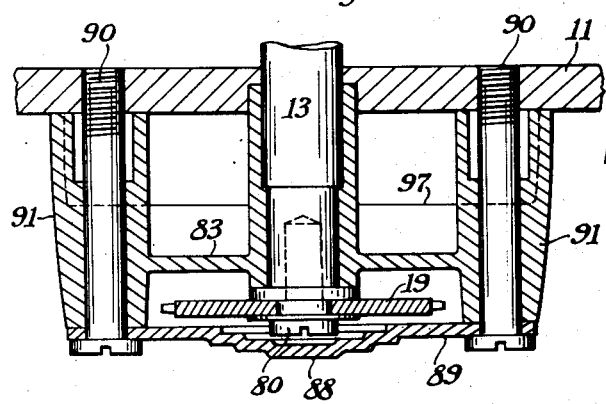

Fig. 9 is a vertical sectional view of the system illustrated in Fig. 8 taken substantially on line 9—9 thereof showing the relation of the sprocket and its supporting shaft thereto; and Fig. 10 is a horizontal sectional view taken substantially on line 10—10 of Fig. 8 showing the relation of the system to the sprocket, and the arrangement for connecting the system parts and for mounting the system on the base plate or mechanism housing sprocket boss.

Similar reference numerals throughout the various views indicate the same parts.

Figure 1:
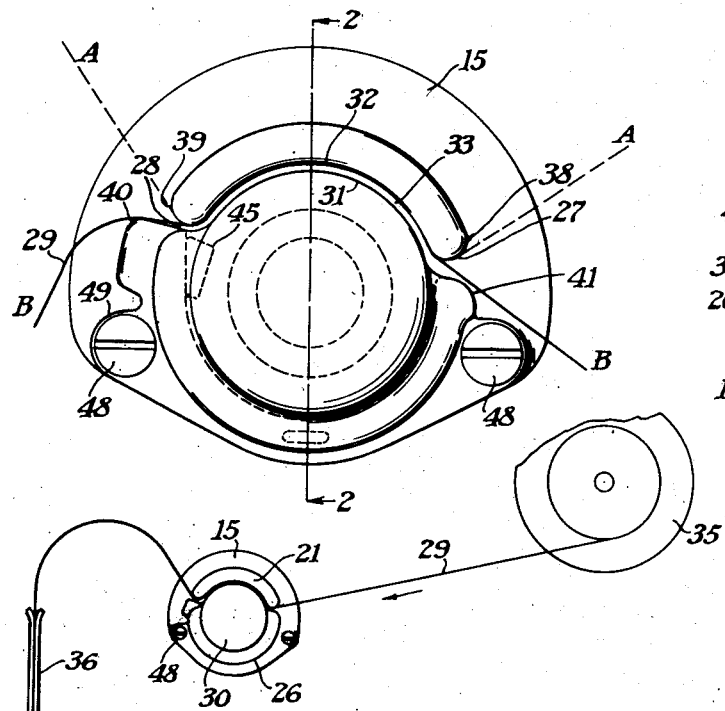
Fig. 1 is a front elevation view of one embodiment of a sprocket enclosing system constructed in accordance with the present invention.
Figure 2:
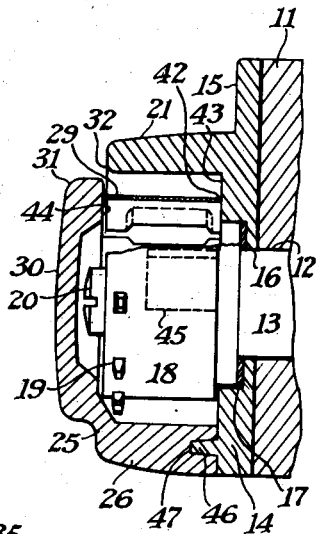
Fig. 2 is a vertical, sectional view taken through the system illustrated in Fig. 1, showing the relation of the system to the film sprocket.
Figure 3:
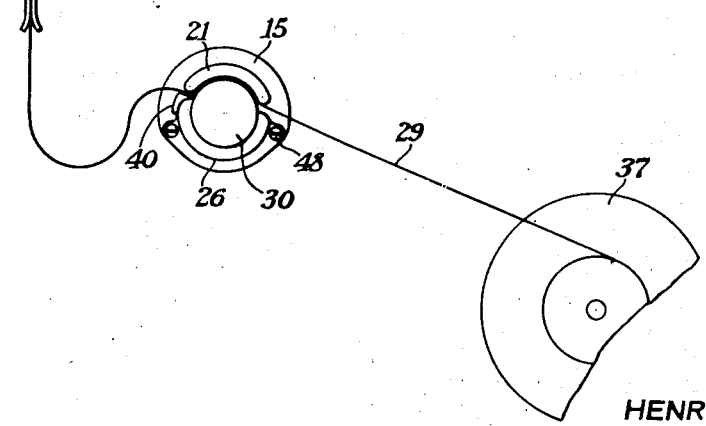
Fig. 3 is a diagrammatic view showing the relation of the enclosing sprocket system, shown in Fig. 1, arranged in the film path of a motion picture apparatus, such as a projector.

Figs. 1–3 show one form of a sprocket enclosing system constructed in accordance with the present invention. As the invention relates to the sprocket enclosing system, only so much of the projector is shown as relates to the system. The other projector parts may be of any suitable or well known construction, and do not constitute a part of the present invention. Accordingly, these other projector parts are not shown or described.

Referring now to Fig. 2, there is shown a base plate or mechanism housing sprocket boss 11 to which the enclosing system is mounted. The plate 11 is formed with an aperture 12 through which the sprocket shaft 13 extends. An inner sprocket housing, broadly designated by the numeral 14, is provided with a flat, radially extending plate portion 15, which overlies the base 11, see Fig. 2. The portion 15 is provided with an opening 16 in registry with the opening 12 to receive shaft 13. The housing 14 is positioned, as shown in Fig. 2, against the plate 11. A thrust washer 17, sprocket hub 18 and sprocket 19 are then assembled on the free or left end of shaft 13, the latter bring spring loaded to the right, in a manner well known in the art. A screw 20 then serves to retain the assembled parts on the shaft 13 and to hold the plate 15 in contact with the base 11, all as clearly shown in Fig. 2. As the sprocket and hub assembly do not form, per se, a part of the present invention, further details are not shown or illustrated. It is apparent that the above-described assembly serves to retain the plate 15 of the inner housing 14 in tight engagement with the base plate 11, as is apparent from an inspection of Fig. 2. The inner housing 14 is also provided with an axially extending arcuately shaped portion 21 which extends over and covers the upper portion of the sprocket assembly, as shown in Figs. 1 and 2. Although the inner housing sprocket 14 is now held against the sprocket base or base plate 11 by the hub assembly, it is free to rotate and translate for the final orientation with respect to the sprocket 19.

An outer sprocket housing broadly designated by the numeral 25, is formed with an axially extending arcuate portion 26 which overlies the bottom portion of the sprocket assembly to cooperate with the portion 21 to enclose the sprocket circumferentially. The adjacent edges of portions 21 and 26 are spaced at substantially diametrically opposite points to provide film inlet opening 27 and the film exit opening 28 to permit the film strip 29 to be fed to and from the sprocket, as is deemed apparent. The outer housing 25 is also formed with a radially extending end plate 30 formed integral with the portion 26 and cooperating with the latter and portion 21 to enclose the sprocket assembly. The top edge 31 of plate 30 is curved and is concentric with and slightly spaced from inner edge 32 of portion 21 to provide a narrow arcuate slot 33 through which the film strip may be inserted laterally to engage the sprocket 19.

When the film 29 is being fed from supply reel 35 and over the upper film sprocket, see Fig. 3, to the film gate 36, the film travels approximately through a path A—A, Fig. 1, over the upper portion of the sprocket. However, when the film passes from gate 36 to the lower or take-up reel 37, it passes approximately through a path B—B, Fig. 1, over the upper portion of the lower sprocket. Thus, the exact direction of travel over the sprocket depends upon the relation of the sprocket to the film. However, both upper and lower sprocket assemblies and their enclosing systems, therefore, are identical in structure. In both cases the film passes only over the upper portion of the sprocket, as clearly shown in Figs. 1 and 3. When the system is used as a drive sprocket, such as the upper sprocket Fig. 3, the incoming film contacts a vertical film guide surface 38 formed at the right edge of the portion 21. The guided film then engages sprocket 19, and, on leaving the system, contacts the vertical guide 39 formed at the left edge of the portion 21, see Fig. 1, thus the arcuate portion 21 serves to guide the film to and from the sprocket when the latter is used as an upper or drive sprocket.

When, however, the film passes to the lower reel 37, it engages the guide surface 40 formed on the left end of portion 26 adjacent the exit opening 28, then to the guide surface 39 and finally to the sprocket 19. The surface 40 is carefully oriented with respect to the surface 39 to insure proper feeding of the film from the lower film loop to the lower sprocket. The film feeds off the lower sprocket over the surface 38 or guide surface 41 formed on portion 26 adjacent the inlet opening 27 and thence to the take-up reel 37. The particular surface 38 or 41 contacted by the film leaving the lower enclosing system depends upon the diameter of the film on the reel 37. Thus, the guide surfaces 38—39, 40 and 41, provide vertical guides for the incoming and leaving film strips and insures positive engagement of the strip with the sprocket.

In the course of its travel over the sprocket, the marginal edges 42 of the film strip 29 engage the inner surface 43 of plate 15 and the inner surface 44 of plate 30 to provide lateral guides for the film so as to insure that the marginal perforations of the film strip will be maintained in lateral alignment with the teeth of the sprocket 19, the advantages of which are deemed apparent. Thus, the film is guided both vertically and laterally. As the trailing end of the film approaches the exit 28, said end may tend to be picked up by and fed under the sprocket. In order to overcome such a possibility the arcuate portion 26 is provided with an inwardly extending lug or surface 45 positioned adjacent the sprocket 19 and adjacent the film exit 28. This lug serves to strip the trailing end of the film from the sprocket to permit said end to pass over guide 39 and through the exit opening 28. The outer housing 25 is located positively with respect to inner housing 14 by means of a projecting tongue 46 formed on the plate 15 and extending into and registering opening 47 formed on part 26, see Fig. 2. The two housings are then anchored to the plate 11 by means of screws 48 which pass through ears 49 on portion 26 and then through plate 15 to plate 11.

Figure 4:
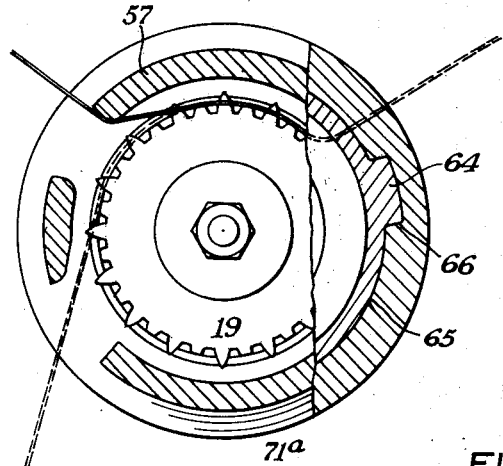
Fig. 4 is a broken away end view of a sprocket enclosing system constructed in accordance with another embodiment of the invention, showing the relation of the parts of the system to the film sprocket.
Figure 5:
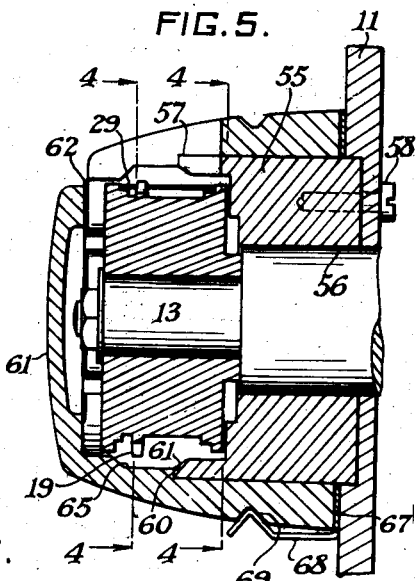
Fig. 5 is a vertical, sectional view taken substantially on line 5—5 of Fig. 4, showing the relation of the system parts of Fig. 4 to the sprocket and its supporting shaft.

Figs. 4–7 show a modified sprocket enclosing system in which the inner sprocket housing is formed to provide a cylindrical member 55 positioned between the sprocket assembly, which may be of the type above described, and the base plate 11. The member 55 is formed with a central axial opening 56 through which the sprocket shaft 13 extends. The member 55 is provided with an overhanging axially extending ring 57 which overlies the sprocket assembly, as best shown in Fig. 5. The member 55 may be anchored or fixed to the plate 11 in any suitable manner such, for example, by screws 58. The outer sprocket housing is in the form of a tubular member 59 which slides over portion 55 in telescoping relation. A shoulder 60 formed on the inner surface of the member 59 engages the edge 61 of ring 57 to position the member 59 on portion 55. The outer housing is formed with an integral end plate 61 which overlies the end of the sprocket to complete the enclosure thereof. An arcuate slot 62 is formed in plate 61 to permit lateral insertion of the film strip so that the latter may be moved into engagement with the sprocket.

In order to prevent rotation of the outer housing relative to the inner housing, a spline connection is provided therebetween. To this end, the outer surface 63 of the inner member 55 is provided with a plurality of radially extending lugs 64, in the present instance three. The inner surface 65 of the portion 59 is formed with similarly shaped slots or grooves 66 to receive the lugs 64. This construction permits free axial sliding of the portion 59 on member 55 yet effectively prevents relative rotation thereon. To insure proper assembly of the housings, the lugs 64 and grooves 65 are not all of equal width so that the part 59 can be assembled on the portion 55 only in one definite relative position. The portion 59 is held in place by a snap ring 67 having a plurality of flexible fingers 68 which engage in notches 69 formed on the outer surface of the portion 59. Thus, the two housing members are retained in proper assembled relation.

Figure 6:
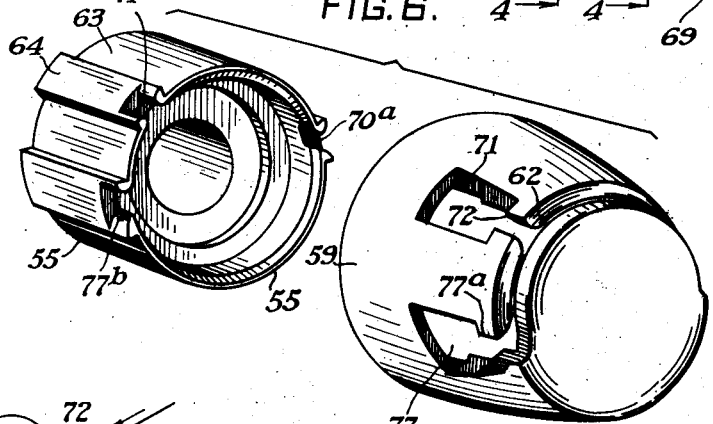
Fig. 6 is a perspective exploded view of the two housing or enclosing members of the sprocket enclosing system illustrated in Figs. 4 and 5.
Figure 7:
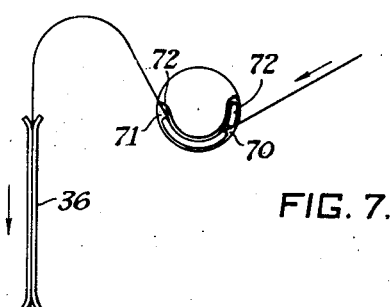
Fig. 7 is a diagrammatic view, showing the position of the sprocket enclosing system of Figs. 4–6 in connection with the film path of a motion picture apparatus such as a projector.
Figure 7:
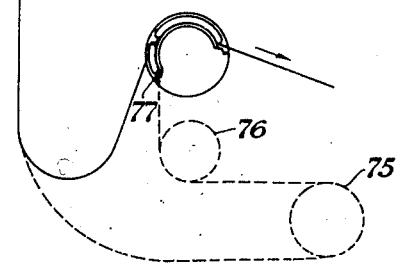

The portion 59 is provided with a film inlet 70 and a film outlet 71 so that the film strip may be fed to and from the sprocket. The film is guided laterally by means of shoulders formed on the sprocket hub, as shown in Fig. 5, rather than by means of lateral guides on the inner and outer housings, as in the arrangement in Figs. 1–3. However, in both cases lateral guiding of the film is provided so as to insure proper cooperation of the sprocket teeth with the film perforations. In addition, in order to vertically guide the film, the portion 59 is provided with liplike section or edges 72 which engages the upper surface of the film strip to provide vertical guides for the strip to insure that the latter will be retained in positive engagement with the sprocket. The edges 72 are positioned at inlet 70 and outlet 71, as best shown in Figs. 4 and 6. Thus, the film strip is guided both vertically and laterally during its passage over the sprocket. When the enclosing system is used in connection with the upper or drive sprocket, the system is positioned as shown in Fig. 7 so that the film will be fed over the bottom of the sprocket. However, when used in connection with the lower or hold-back sprocket, the system is reversed so that the film feeds over the top of the sprocket. When the device is used in connection with a silent projector the film follows the path shown in solid lines in Fig. 7. However, the enclosing system is also adapted for use in connection with a sound projector. In such a sound apparatus, the film is fed as shown in dotted lines Fig. 7 from the film gate 36 to and around a sound drum 75 then over an idler roll 76 to the lower sprocket. Obviously when the film follows this latter path it will be rather difficult to have the film enter the enclosing system through the film inlet 70. Therefore, the portion 59 is provided with an additional or auxiliary film inlet 77 positioned below the inlet 70, as shown in Fig. 7. With this arrangement the film may be fed in a straight line from the roller 76 to the lower sprocket, the advantages of which are deemed apparent. This auxiliary inlet 77 is also provided with a vertical film guide 77a positioned at the auxiliary inlet. Due to the non-uniformity of the lugs 64 and grooves 66, the housing 59 can be assembled on the portion 55 only in a definite relative relation thus assuring the correct positioning of film inlets and film outlets. In order that the film passing through inlet 70 or 77 and the outlet 71 may engage the sprocket proper, the overhanging ring 57 of the portion 55 is provided with slots 70a, 71a and 77b, arranged in registry with the inlets 70 and 77 and the outlet 71 to provide continuous openings through the enclosure member.

Figs. 8-10 show still another modification of a sprocket enclosing system in which a single sprocket is used both as a drive sprocket and as a hold-back sprocket. In this embodiment, sprocket 19 is mounted directly on the sprocket shaft 13 and is held thereon by a screw 80. The shaft extends through a bushing 81 formed integral with the inner housing which comprises a cylindrical member 82 spaced from and concentric with bushing 81 but connected thereto by a radial flange or web 83, as shown in Fig. 9. An outer casing 84 surrounds the cylindrical member 82 and is connected thereto by a radial web 85 spaced axially from web 83, or to the left thereof as viewed in Fig. 9. The above described arrangement provides an annular groove 86 around the sprocket to provide the desired dual film paths as shown in Fig. 8. The annular recess 86 communicates with a pair of channels 87 positioned on opposite sides of the sprocket. A sprocket guard plate has a central circular portion 88, and side portions 89 which conform in shape to the channels 87. Studs 90 extend through parts 89 of the cover plate and posts 91 formed on an inner housing, and are threaded into the base plate 11 or other suitable support to connect both the cover plate and the housing to the base plate, as shown in Fig. 10. The studs 90 not only retain the enclosing parts in position on the base plate, but also holds the cover plate in proper relation to the inner housing.

The film passes from the supply reel, not shown, and enters the film enclosing system through an inlet 92, passes over the top of the sprocket and then leaves the system through film outlet 93, as shown by the upper dotted line, Fig. 9. After the film passes through the film gate, not shown, it again enters the system through a film inlet 94, passes over the bottom of the sprocket, and then leaves through a film outlet 95, the film following the path shown by the lower dotted lines, Fig. 9.

During the passage of the film through the system in either direction, one marginal edge of the film engages the inner surface 96 of a radial guide 97 of the inner housing, while the other marginal edge of the film engages the inner surface 98 of the sprocket guard plate, as shown in Fig. 9 to afford effective lateral guiding for the film. The sprocket guard plate closes the annular groove 86 and may be broadly considered as an outer housing so that the film may be deemed to be guided laterally by the inner and outer housings. In addition, the web 85 is formed with curved sections 99 which serve to guide the film vertically in its passage to and from the enclosing system. Such vertical guides are best shown in Fig. 8, and are positioned adjacent the two film inlets 92 and 94 and the two film outlets 93 and 95. Thus, the film strip is guided both vertically and laterally. The upper and lower edges 100 and 101 of the sprocket guard plate conform to the shape of the edges of the web 85 as shown in Fig. 8, to provide upper and lower film insertion slots 102 and 103 through which the film may be inserted laterally, and into engagement with the sprocket, as shown in dotted lines 104 of Fig. 9. Thus the film inlets and film outlets or openings, and film insertion slots are provided. In addition, the film strip during its passage through the enclosing system is guided accurately and positively by stationary lateral and vertical guiding members formed on the system itself.

It is apparent from the above description that the present invention provides a sprocket enclosing system which effectively encloses the sprocket, yet assures proper feeding of the film. The latter is retained in contact with the sprocket without the use of commonly employed movable members. The film is guided to and from the sprocket by suitably arranged fixed vertical and lateral guide members or surfaces which insure proper cooperation of the film strip with the sprocket. The enclosing system of the present system is attractive, easy to thread, low in cost, and free from moving parts.

While certain embodiments of the invention have been disclosed, it is to be understood that the inventive idea may be carried out in a number of ways. Therefore, this application is not to be limited to the precise details disclosed, but is intended to cover all variations and modifications which fall within the scope of the appended claims.

I claim:

1. In a motion picture apparatus, the combination with a film feeding sprocket, a supporting shaft therefor, and a base plate through which said shaft projects, of a sprocket enclosing system comprising, in combination, an inner sprocket housing having a portion positioned on one side of said sprocket and between said sprocket and said plate, another portion of said housing being formed to provide an arcuate section which extends over at least a part of said sprocket, an outer sprocket housing having at least a portion thereof positioned on another side of said sprocket and cooperating with said first housing to provide an enclosed system for said sprocket, said system being formed to provide a film insertion slot and a film entrance opening and a film exit opening, and film guide means on said housings.

2. In a motion picture apparatus, the combination with a film feeding sprocket, a supporting shaft therefor, and a base plate through which said shaft projects, of a sprocket enclosing system comprising, in combination, an inner sprocket housing having a portion positioned on one side of said sprocket and between said sprocket and said plate, another portion of said housing being formed to provide an arcuate section which extends over at least a part of said sprocket, an outer sprocket housing having at least a portion thereof positioned on another side of said sprocket and cooperating with said first housing to provide an enclosed system for said sprocket, said housings being spaced to provide an arcuate film insertion slot to permit the positioning of the film in contact with said sprocket, said housings also being provided with a film entrance slot and a film exit slot, and film guides on said housings adjacent said slots.

3. In a motion picture apparatus, the combination with a film feeding sprocket, a supporting shaft therefor, and a base plate through which said shaft projects, of a sprocket enclosing system comprising, in combination, an inner sprocket housing having a portion positioned on one side of said sprocket and between said sprocket and said plate, another portion of said housing being formed to provide an arcuate section which extends over at least a part of said sprocket, an outer sprocket housing having at least a portion thereof positioned on another side of said sprocket and cooperating with said first housing to provide an enclosed system for said sprocket, said system being formed to provide a film insertion slot and a film entrance opening and a film exit opening, lateral film guides on said housings, and vertical film guides on said housings cooperating with said lateral guides.

4. In a motion picture apparatus, the combination with a film feeding sprocket, a supporting shaft therefor, and a base plate through which said shaft projects, of a sprocket enclosing system comprising, in combination, an inner sprocket housing having a portion positioned on one side of said sprocket and between said sprocket and said plate, another portion of said housing being formed to provide an arcuate section which extends over at least a part of said sprocket, an outer sprocket housing having at least a portion thereof positioned on another side of said sprocket and cooperating with said first housing to provide an enclosed system for said sprocket, said system being formed to provide a film insertion slot and a film entrance opening and a film exit opening, lateral film guides on said housings, and vertical film guides formed on said housings adjacent said openings.

5. In a motion picture apparatus, the combination with a film feeding sprocket, a supporting shaft therefor, and a base plate through which said shaft projects, of a sprocket enclosing system comprising, in combination, an inner sprocket housing having a portion positioned on one side of said sprocket and between said sprocket and said plate, another portion of said housing being formed to provide an arcuate section which extends over at least a part of said sprocket, an outer sprocket housing having at least a portion thereof positioned on another side of said sprocket and cooperating with said first housing to provide an enclosed system for said sprocket, said system being formed to provide a film insertion slot and a film entrance opening and a film exit opening, means for connecting said housings in operative relation, and means to secure said system to said plate in enclosing relation with said sprocket.

6. In a motion picture apparatus, the combination with a film feeding sprocket, a supporting shaft therefor, and a base plate through which said shaft projects, of a sprocket enclosing system comprising, in combination, an inner sprocket housing having a portion positioned on one side of said sprocket and between said sprocket and said plate, another portion of said housing being formed to provide an arcuate section which extends over at least a part of said sprocket, an outer sprocket housing having at least a portion thereof positioned on another side of said sprocket and cooperating with said first housing to provide an enclosed system for said sprocket, said system being formed to provide a film insertion slot and a film entrance opening and a film exit opening, and means on said system adjacent said exit opening to strip the film strip from said sprocket.

7. In a motion picture apparatus, the combination with a film feeding sprocket, a supporting shaft therefor, and a base plate through which said shaft projects, of a sprocket enclosing system comprising, in combination, an inner sprocket housing having a portion positioned on one side of said sprocket and between said sprocket and said plate, another portion of said housing being formed to provide an arcuate section which extends over at least a part of said sprocket, an outer sprocket housing having at least a portion thereof positioned on another side of said sprocket and cooperating with said first housing to provide an enclosed system for said sprocket, said system being formed to provide a film insertion slot and a film entrance opening and a film exit opening, means for connecting said housings in operative relation, means to secure said system to said plate and in enclosing relation with said sprocket, and means on one of said housings adjacent said exit opening to strip the film strip from said sprocket.

8. In a motion picture apparatus, the combination with a film feeding sprocket, a supporting shaft therefor, and a base plate through which said shaft projects, of a sprocket enclosing system comprising, in combination, an inner sprocket housing having a portion positioned on one side of said sprocket and between said sprocket and said plate, another portion of said housing being formed to provide an arcuate section which extends over at least a part of said sprocket, an outer sprocket housing having at least a portion thereof positioned on another side of said sprocket and cooperating with said first housing to provide an enclosed system for said sprocket, said system being formed to provide a film insertion slot and a film entrance opening and a film exit opening, means for connecting said housings in operative relation, means to secure said system to said plate and in enclosing relation with said sprocket, and means on said outer housing adjacent said exit opening to strip the film from said sprocket.

9. In a motion picture apparatus, the combination with a film feeding sprocket, a supporting shaft therefor, and a base plate through which said shaft projects, of a sprocket enclosing system comprising, in combination, an inner sprocket housing having a portion positioned on one side of said sprocket and between said sprocket and said plate, another portion of said housing being formed to provide an arcuate section which extends over at least a part of said sprocket, an outer sprocket housing having at least a portion thereof positioned on another side of said sprocket and cooperating with said first housing to provide an enclosed system for said sprocket, said system being formed to provide a film insertion slot and a film entrance opening and a film exit opening, means for connecting said housings in operative relation, means to secure said system to said plate and in enclosing relation with said sprocket, and lateral and vertical film guides on said housings.

10. In a motion picture apparatus, the combination with a film feeding sprocket, a supporting shaft therefor, and a base plate through which said shaft projects, of a sprocket enclosing system comprising, in combination, an inner sprocket housing having a radially extending portion positioned between said sprocket and said plate and formed with an opening through which said shaft projects, an axially extending arcuate portion formed on said housing and extending at least part way around said sprocket, an outer housing formed with an axially extending arcuate portion cooperating with the arcuate portion of said first housing to enclose said sprocket substantially circumferentially, and a radial portion formed on said second housing for closing the end of said system.

11. In a motion picture apparatus, the combination with a film feeding sprocket, a supporting shaft therefor, and a base plate through which said shaft projects, of a sprocket enclosing system comprising, in combination, an inner sprocket housing having radially extending portion positioned between said sprocket and said plate and formed with an opening through which said shaft projects, an axially extending arcuate portion formed on said housing and extending at least part way around said sprocket, an outer housing formed with an axially extending arcuate portion cooperating with the arcuate portion of said first housing to enclose said sprocket substantially circumferentially, and film guides formed on said housings to retain said film in positive engagement with said sprocket.

12. In a motion picture apparatus, the combination with a film feeding sprocket, a supporting shaft therefor, and a base plate through which said shaft projects, of a sprocket enclosing system comprising, in combination, an inner sprocket housing having radially extending portion positioned between said sprocket and said plate and formed with an opening, through which said shaft projects, an axially extending arcuate portion formed on said housing and extending at least part way around said sprocket, an outer housing formed with an axially extending arcuate portion cooperating with the arcuate portion of said first housing to enclose said sprocket substantially circumferentially, and means to strip the trailing end of the film from said sprocket.

13. In a motion picture apparatus, the combination with a film feeding sprocket, a supporting shaft therefor, and a base plate through which said shaft projects, of a sprocket enclosing system comprising, in combination, an inner sprocket housing having radially extending portion positioned between said sprocket and said plate and formed with an opening through which said shaft projects, an axially extending arcuate portion formed on said housing and extending at least part way around said sprocket, an outer housing formed with an axially extending arcuate portion cooperating with the arcuate portion of said first housing to enclose said sprocket substantially circumferentially, means to connect and position said outer housing on said inner housing, and means to attach said system to said plate in enclosing relation with said sprocket.

14. In a motion picture apparatus, the combination with a film feeding sprocket, a supporting shaft therefor, and a base plate through which said shaft projects, of a sprocket enclosing system comprising, in combination, a cylindrical inner housing having a portion positioned between said sprocket and said plate, and an axially extending annular flange overlying said sprocket, an outer housing having a cylindrical section slidable on said inner housing in a telescoping relation, means on said housings to retain the latter in proper assembled relation, an end plate formed on the end of said section and overlying said sprocket and cooperating with said housings to enclose said sprocket, said outer housing being formed with a film inlet and a film exit to permit the film to be fed to and from said sprocket, and film guides on said housings.

15. In a motion picture apparatus, the combination with a film feeding sprocket, a supporting shaft therefor, and a base plate through which said shaft projects, of a sprocket enclosing system comprising, in combination, a cylindrical inner housing having a portion positioned between said sprocket and said plate, an axially extending annular flange overlying said sprocket, an outer housing having a cylindrical section slidable on said inner housing in a telescoping relation, means on said housings to retain the latter in proper assembled relation, an end plate formed on the end of said section and overlying said sprocket and cooperating with said housings to enclose said sprocket, said outer housing being formed with a film inlet and a film exit to permit the film to be fed to and from said sprocket, lateral film guides formed on said sprocket, and vertical film guides on one of said housings adjacent said inlet and exit.

16. In a motion picture apparatus, the combination with a film feeding sprocket, a supporting shaft therefor, and a base plate through which said shaft projects, of a sprocket enclosing system comprising, in combination, an inner sprocket housing having a radially extending portion positioned between said sprocket and said plate and formed with an opening through which said shaft projects, and axially extending arcuate portion formed on said housing and extending at least part way around said sprocket, means connected to said inner housing and cooperating therewith to substantially enclose said sprocket, said means being spaced radially from said inner housing to form a film insertion slot and a film inlet opening and a film outlet opening, said openings permitting feeding of the film to and from said sprocket; and means for guiding said film both laterally and vertically.

17. In a motion picture apparatus, the combination with a film feeding sprocket, a supporting shaft therefor, and a base plate through which said shaft projects, of a sprocket enclosing system comprising, in combination, an inner sprocket housing formed to provide a radial portion arranged to overlie one side of said sprocket, a pair of concentrically arranged walls to provide an annular groove adjacent the teeth of said sprocket to receive a film strip when engaged by said sprocket, one of said concentric walls overlying said film to cover substantially the periphery of said sprocket, an end plate overlying the other side of said sprocket, and means to connect said plate and said housing in cooperating relation to enclose said sprocket, said plate and housing having portions thereof formed to provide a film inlet and a film outlet for said enclosing system.

18. In a motion picture apparatus, the combination with a film feeding sprocket, a supporting shaft therefor, and a base plate through which said shaft projects, of a sprocket enclosing system comprising, in combination, an inner sprocket housing formed to provide a radial portion arranged to overlie one side of said sprocket, a pair of concentrically arranged walls to provide an annular groove adjacent the teeth of said sprocket to receive a film strip when engaged by said sprocket, one of said concentric walls overlying said film to cover substantially the periphery of said sprocket, an end plate overlying the other side of said sprocket, means to connect said plate and said housing in cooperating relation to enclose said sprocket, said plate and housing having portions thereof formed to provide a film inlet and a film outlet for said enclosing system, and means on said housing and said plate engaged by opposite marginal edges of said film strip to maintain the latter in proper lateral relation with said sprocket.

HENRY N. FAIRBANKS.

References Cited in the file of this patent
UNITED STATES PATENTS

| Number | Name | Date |
|---|---|---|
| 1,614,241 | Howell | Jan. 11, 1927 |
| 1,886,540 | Grant | Nov. 8, 1932 |
| 1,988,981 | Debrie | Jan. 22, 1935 |
| 2,017,138 | Wittel | Oct. 15, 1935 |
| 2,397,713 | Waller | Apr. 2, 1946 |